United States Patent
Dent

(10) Patent No.: US 6,356,771 B1
(45) Date of Patent: Mar. 12, 2002

(54) RADIO COMMUNICATIONS SYSTEM WITH ADAPTIVE POLARIZATION

(75) Inventor: Paul W. Dent, Pittsboro, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/113,316

(22) Filed: Jul. 10, 1998

(51) Int. Cl.[7] .................................................. H04B 1/38
(52) U.S. Cl. ..................................... 455/562; 455/277.1
(58) Field of Search .............................. 455/561, 277.1, 455/277.2, 278.1, 229.1, 273, 275, 450

(56) References Cited

U.S. PATENT DOCUMENTS

| 3,956,699 A | * | 5/1976 | Leahy ........................ 325/15 |
| 5,491,837 A | | 2/1996 | Haartsen |
| 5,724,666 A | | 3/1998 | Dent |
| 5,838,670 A | | 11/1998 | Billstrom |
| 6,222,503 B1 | * | 4/2001 | Gietema et al. ............ 343/890 |

FOREIGN PATENT DOCUMENTS

| EP | 0210254 A2 | 11/1986 |
| EP | 0847209 A2 | 6/1998 |

* cited by examiner

Primary Examiner—Vivian Chang
Assistant Examiner—Naghmeh Mehrpour
(74) Attorney, Agent, or Firm—Wood, Phillips, Van Santen, Clark & Mortimer

(57) ABSTRACT

A radio base station having a plurality of directional sector antennas for providing communications with outstations lying at different azimuth angles to the base station is disclosed in which the antennas transmit signals using one or both of two orthogonal polarizations such as left hand or right hand circular antennas and polarization and which also measures interference levels on different frequency channels that are used for allocating an optimum channel and polarization for connecting a call. Each of the outstations comprise at least one antenna of selectable polarization.

2 Claims, 9 Drawing Sheets

--- 12 Sectors using channel group 1
——— 12 Sectors using channel group 2

12 Sectors using channel group 1 and LHC polarization (LHC 1)
12 Sectors using channel group 2 and LHC polarization (LHC 2)
12 Sectors using channel group 1 and RHC polarization (RHC 1)
12 Sectors using channel group 2 and RHC polarization (RHC 2)

RADIO COMMUNICATIONS SYSTEM WITH ADAPTIVE POLARIZATION

RELATED APPLICATION

This application is related to U.S. Pat. No. 5,724,666 to Dent, the subject matter of which is incorporated by reference.

BACKGROUND

The present invention relates to radiotelephone systems such as cellular phone systems, indoor cordless systems and wireless in the local loop (WLL) systems, and more particularly to methods of allocating channel parameters such as frequency, timeslots, polarization and power level in order to optimize signal quality.

The Digital European Cordless Telephone system (DECT) is an existing example of a wireless telephone system employing adaptive allocation frequency channels and timeslots for connecting a call. In the DECT systems, single-frequency duplex operation is employed by alternately transmitting a TDMA burst from a base station to an outstation and from the outstation to the base station. This is known as Time Division Duplex (TDD). The use of TDD and a common frequency for both directions of communications means that both the base and station and the outstation experience a common interference environment, particularly in indoor, wireless PABX applications for which DECT was designed. Thus, either the base station or the outstation can choose a frequency channel and a timeslot having momentarily minimum interference levels with near certainty that the chosen channel will be a good channel for communicating in both directions. In DECT, the outstation is allowed to choose the frequency and timeslot without a prior warning to the base station. The base station listens on all frequencies and timeslots in order to ensure that it always receives the signal. Signal bursts from different outstations are identified by means of a short ID code so that the base station can assemble bursts received from the same outstation on different channels. The base station transmits to the outstation using a timeslot in the transmit half of its TDD frame period corresponding to the timeslot in which the immediately previous data was received from the same outstation. The outstation listens for the base station on the receive timeslot in the receive half of its TDD frame corresponding to the transmit timeslot it used immediately previously to transmit to the base station. In this way, fast adaptation to changing interference scenarios is achieved in DECT.

The DECT system also employs adaptive antenna selection (space selection diversity) in order to mitigate slow fading caused by a wireless telephone user moving inside a building at walking pace, for example.

The base station may transmit a timeslot using a first or a second antenna, spaced so that fading of the path from the first antenna to the outstation is uncorrelated with fading from the second antenna to the outstation. The antenna used for transmitting a slot is indicated by a data bit contained in the slot. The outstation receives slots intended for it as well as slots intended for other outstations and determines whether it can receive a slot transmitted by one antenna better than a slot transmitted by another antenna. The outstation then selects a channel frequency and timeslot containing the lowest measured signal level for use in transmitting to the base station. This indicates that the channel is not in use nearby and transmits data to the base station in that slot including an indication of the base station antenna it prefers for receiving a reply.

When different frequencies are used for transmission and reception, correlation between their interference environments cannot be assumed. The polarization to be used by outstations and base stations is not defined in the DECT systems. Thus, a potential doubling of system capacity by polarization reuse is not available.

U.S. Pat. No. 5,491,837 issued to Haartsen describes adaptive channel allocation methods for use in a two-frequency duplex system. The outstations measure signals received on channels in a first frequency band from various base stations and transmit the signal measurements to the serving base station. The serving base station knows the power transmitted by all base stations and can, therefore, determine the path loss from every base station to the outstation in the first frequency band. The serving base station also knows the signals that are transmitted and the channels on which these signals are transmitted by each of the base stations and can, therefore, compute the interference scenario at the outstation on every channel, including channels not measured by the outstation. The base station also measures interference levels on channels in a second frequency band used for the communications from the outstation to the base station. The base station then determines a channel in the first frequency band for transmitting to the outstation and combines it with a channel in the second frequency band for receiving from the outstation. This combination results in good signal quality in both directions. Haartsen, however, is not concerned with determining a best polarization to use for serving a given outstation.

U.S. Pat. No. 5,548,813 issued to Charas et al. and U.S. Pat. No. 5,619,503 issued to Dent also describe the use of multiple-beam antennas for cellular and satellite communications systems. The subject matter of these documents is hereby incorporated by reference. These documents assumed that the communication path length was long so that various non-free-space propagation effects could arise to distort signal polarization. Therefore, it was difficult to count on frequency re-use with different polarization to increase capacity for communicating with mobile terminals. Polarization reuse is, however, disclosed in the context of communicating between a satellite and a fixed ground station. This type of polarization reuse is non-adaptive and both polarizations are used in the same directional beam. The '666 patent also describes cellular base stations in which the polarization is alternated between adjacent sectors of a multiple-sector directional antenna, the main purpose of which is to obtain uncorrelated fading of the same signals received at two adjacent antennas.

SUMMARY

It is an object of the present invention to overcome the deficiencies described above by providing a method for increasing system capacity. This is achieved by utilizing alternating polarization for short range communication, e.g., on the order of one mile, in order to increase capacity of the system by allowing frequency reuse for different signals with different polarization in adjacent sectors.

A radio base station comprises a number of directional sector antennas for providing communications with outstations lying at different azimuth angles to the base station. The directional antennas may transmit signals using one or both of two orthogonal polarizations, such as left or right hand circular polarization. A channel allocation unit allocates spectral resources, sector antennas and polarization for communicating with each outstation in a manner designed to minimize interference between different communications signals. Allocating spectral resources can include allocating a channel frequency, a timeslot or a spread-spectrum access code.

Each outstation comprises at least one antenna to receive at least one polarization, but preferably an antenna of selectable polarization. The outstation antenna may be a directional antenna, in which case it is oriented to provide maximum directional gain towards a base station that is selected to provide radiocommunication service. Each outstation comprises receiver means for receiving control channel signals from the selected base station indicative of incoming call alerts and transmitter means for transmitting responses to call alerts or call initiation requests. The outstation receiver is equipped to measure interference or signal quality levels on different frequency channels or timeslots using selected polarizations and the transmitter is equipped to transmit interference or signal quality measurements made by the receiver to the base station.

The base station is also equipped to make measurements of interference levels on different frequency channels or timeslots using selected polarizations, and to provide these measurements to the channel allocation unit along with measurements received from the outstation. These measurements enable the channel allocation unit to allocate an optimum channel and polarization for connecting a call.

BRIEF DESCRIPTION OF THE DRAWINGS

These and other objects, features and advantages of the present invention will be readily apparent to one skilled in the art from the following written description, read in conjunction with the drawings, in which.

DETAILED DESCRIPTION

Figure 1:
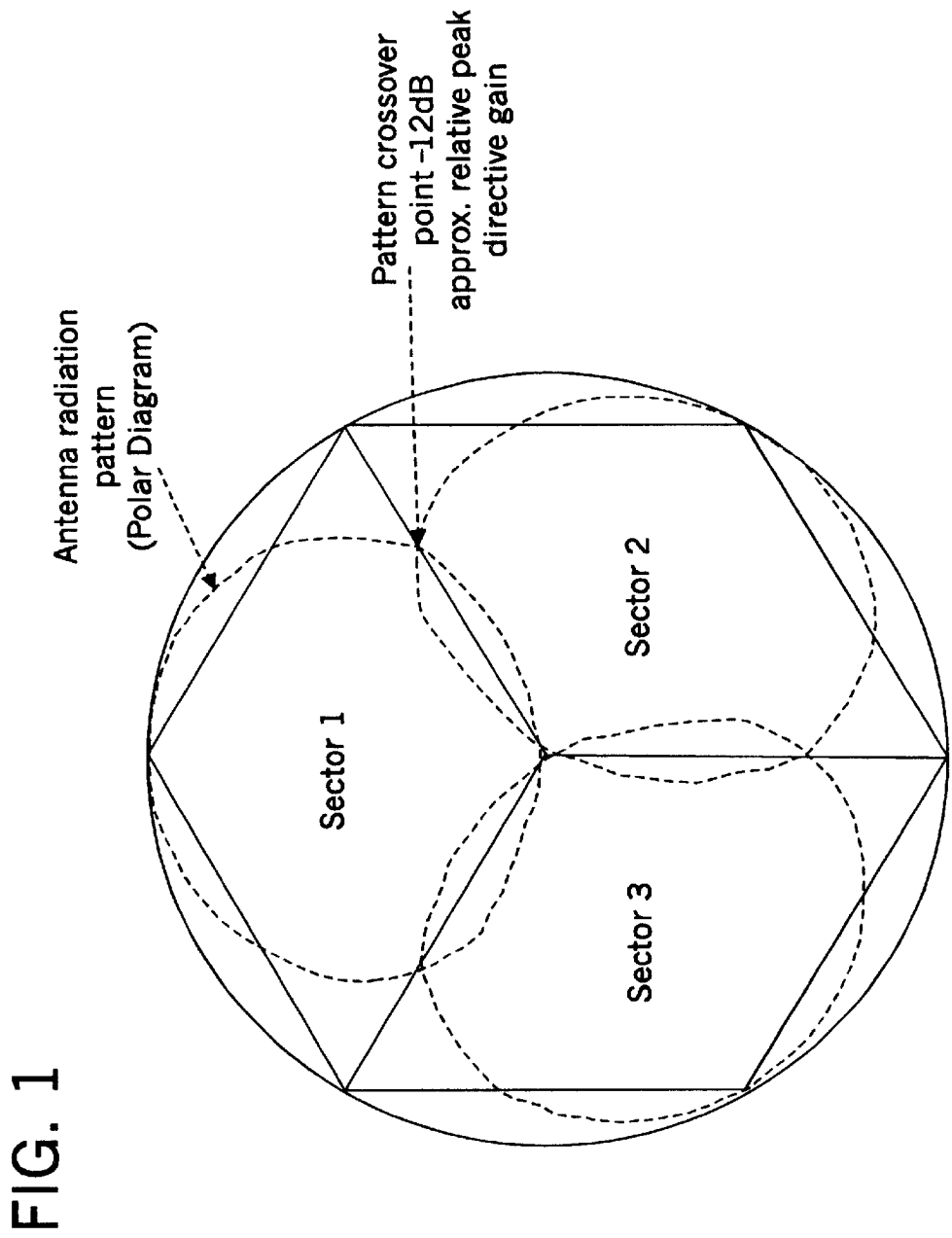
FIG. 1 illustrates a conventional 3-sector cellular base station.

FIG. 1 illustrates the radiation patterns produced by a conventional three-sector cellular base station. The 360 degrees of azimuth around the base station antenna site are divided into three, 120-degree sectors. Each sector has an associated directional antenna with the polar radiation pattern shown, for transmitting to or receiving signals from the outstations such as mobile phones, for example. It is customary in three-sector cellular systems for radiation patterns of the three sectors to cross each other at around −10 to −12 dB relative to peak antenna directivity. This results from the maximum distance at which an outstation can lie from a given site along the line between two sectors being half the maximum distance at the center of a sector. For stations lying further away, an adjacent site (not shown) takes over communications. Given the normally assumed fourth power of distance propagation law, only one-sixteenth of the power (−12 dB) is required to communicate with stations lying at half the distance along the line between two sectors. The patterns illustrated in FIG. 1 are thus tailored to provide roughly equal communications performance around the periphery of the area served by the site.

Figure 2:
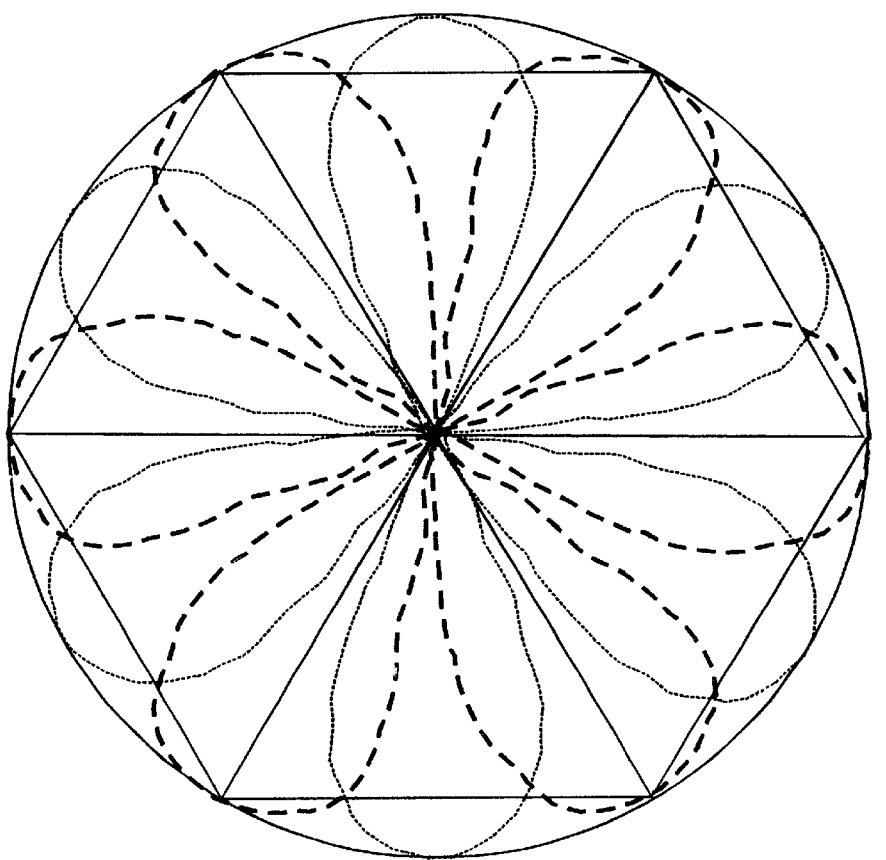
FIG. 2 illustrates a 12-sector site having alternating polarization.

FIG. 2 illustrates alternating polarizations applied to a site of twelve sectors according to an exemplary embodiment of the present invention. Six of the sectors employ Right Hand Circular polarization (RHC) while the other six in between employ Left Hand Circular polarization (LHC). Thus, each of the twelve sectors employ polarization that is opposite each of its two adjacent sectors in order to reduce the interference between sectors.

Table 1 below illustrates the signal to interference ratio (C/I) at an outstation lying at various angles from the base station site without alternating polarization and with alternating polarization. The outstation is served by the best of the sectors, as indicated, to provide the desired signal. The outstation employs an antenna with polarization that matches that of the serving sector. The signals reaching the outstation due to the non-zero sidelobes of other sectors represent interfering signals. The ratio of the desired signal power to the total interfering power in dB represents the signal to interference ratio. Since there is a twelve-fold symmetry in the system, the variation of C/I only needs to be plotted over one repetition cycle of 30 degrees of azimuth.

TABLE 1

| Outstation Position (in Degrees) | C/I (dB) (without alternating polarization) | C/I (dB) (with alternating polarization) | Serving Sector |
|---|---|---|---|
| 0 | 23.6 | 26.0 RHC | 1 |
| 5 | 12.3 | 22.3 RHC | 1 |
| 10 | 5.5 | 17.5 RHC | 1 |
| 15 | −0.4 | 12.8 RHC/LHC | 1 or 2 |
| 20 | 5.5 | 17.5 LHC | 2 |
| 25 | 12.3 | 22.3 LHC | 2 |
| 30 | 24.7 | 26.1 LHC | 2 |

RHC - Right Hand Circular Polarization
LHC - Left Hand Circular Polarization

It can be seen that the C/I, while acceptable for stations at 0 degrees (greater than 20 dB) and tolerable at 5 degrees (greater than 10 dB) from the center of their serving sector, is much lower (5.5 dB and −0.4 dB) at locations between two sectors when adjacent sectors use the same polarization. With adjacent sectors using opposite polarization, however, the C/I is always greater than 12.8 dB.

Another method for reducing interference is to utilize a sector only at angles where it provides an acceptable C/I, such as +/−7.5 degrees from center. The gaps in between are then filled by having a set of twelve sectors displaced by 15 degrees and using a different non-interfering channel, e.g. different frequency or timeslot.

Table 2 below illustrates the C/I improvement obtained by this method, which is disclosed in Applicant's '503 patent.

TABLE 2

| Outstation Position (Degrees) | C/I (dB) without alternating channel group | C/I (dB) with alternating channel group | Serving Sector | Channel Group |
|---|---|---|---|---|
| 0 | 23.6 | 23.6 | 1 | 1 |
| 5 | 12.3 | 12.3 | 1 | 1 |
| 10 | 5.5 | 12.3 | 1.5* | 2 |
| 15 | −0.4 | 23.6 | 1.5 | 2 |
| 20 | 5.5 | 12.3 | 1.5 | 2 |
| 25 | 12.3 | 12.3 | 2 | 1 |
| 30 | 24.7 | 24.7 | 2 | 1 |

*interstitial sector

In table 2, the worst case angular position of the outstations of +/−7.5 degrees is not shown. The C/I at these positions would be somewhat lower than 12.3 dB.

Figure 3:
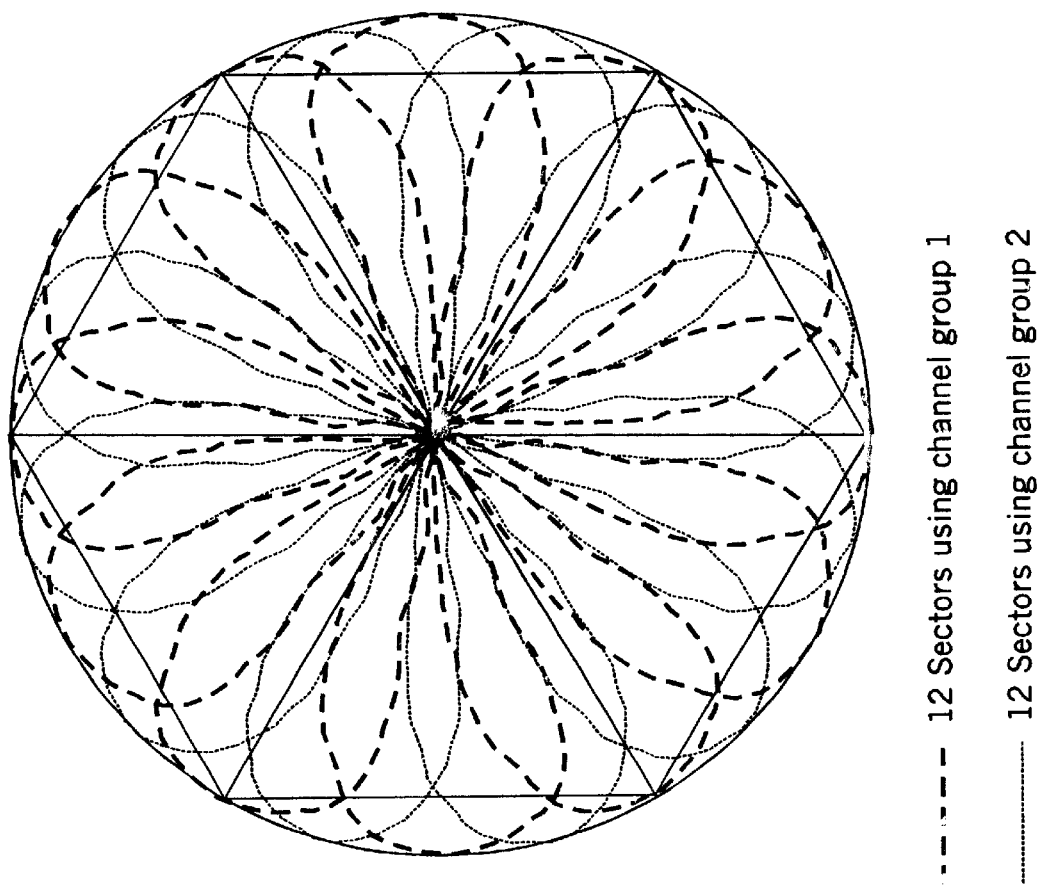
FIG. 3 illustrates a site having twelve sectors for each of two groups of channels with a half-sector offset between the two groups.

FIG. 3 illustrates the arrangement of twelve sectors using channel group 1 plus twelve interstitial sectors using channel group 2. Although this appears to be a twenty four sector system, the beamwidth of the sectors is that of a twelve sector system, so the antenna aperture is not increased. The incorporated references describe how the same number of antenna elements may be used for forming any number of sets of staggered beams with the aid of digital beamforming, for example. Therefore, the provision of interstitial sectors can be accomplished by beamforming software rather than additional antenna hardware.

Figure 4:
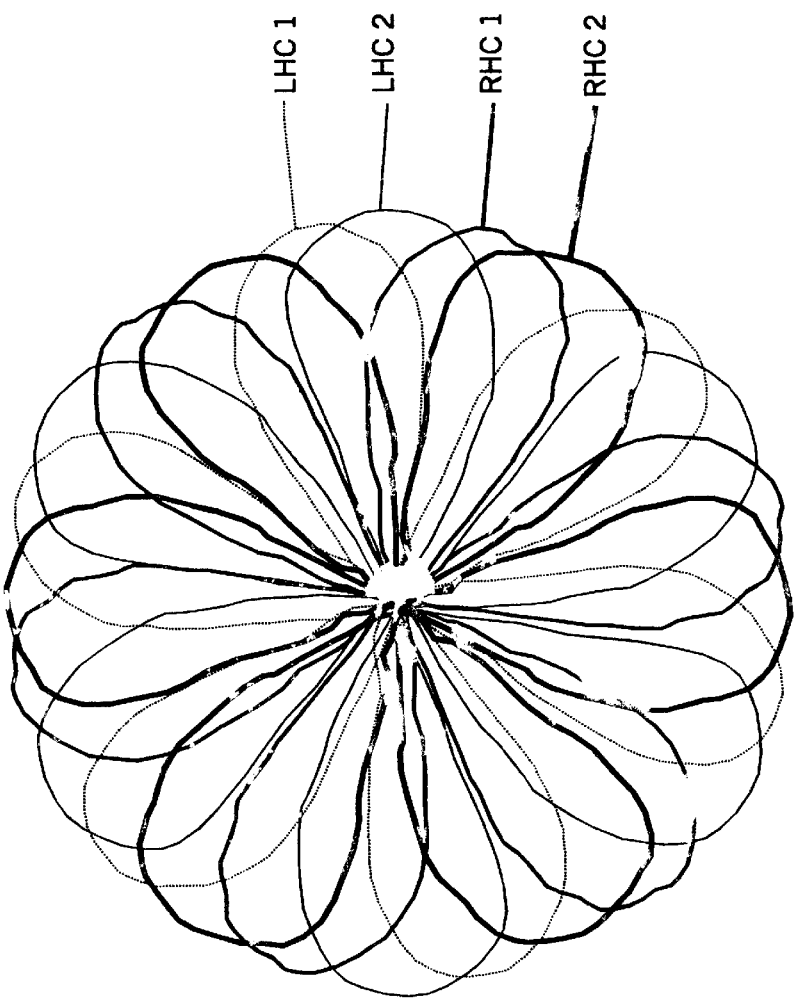
FIG. 4 illustrates a site having twelve sectors for each of two groups of channels with a half-sector offset between the two groups.

In order to increase the C/I further, the arrangement of interstitial sectors of FIG. 3 and the arrangement of alternating polarizations of FIG. 2 may be combined to achieve the arrangement illustrated in FIG. 4. The result is a first group of six sectors spaced 60 degrees apart using channel group 1 and RHC, a second group of six sectors displaced 15 degrees from the first using channel group 2 and RHC; a third group of six sectors displaced a further 15 degrees using channel group 1 and LHC, and a fourth group of six sectors using channel group 2 with LHC. Thus, adjacent ones of the twenty four sectors use different channel groups with no interference between them. Sectors that are separated from each other by two other sectors use the same channel group but different polarizations which limits the interference between them in part by pattern isolation and in part by polarization isolation. Only sectors that are separated by four other sectors use the same channel and polarization but have by then sufficient pattern isolation to provide a high C/I. The C/I resulting from using both interstitial beams and alternating polarization is illustrated in Table 3 below, where the notation 1.5 for a serving sector refers to an interstitial sector between sectors 1 and 2 and the notation 2.5 for a serving sector refers to an interstitial sector between sectors 2 and 3 respectively.

TABLE 3

| Outstation Position | C/I (dB) using both channel and polarization isolation | Serving Sector | Channel Polarization |
|---|---|---|---|
| 0 | 26.0 | 1 | 1 RHC |
| 5 | 22.3 | 1 | 1 RHC |
| 10 | 22.3 | 1.5 | 2 RHC |
| 15 | 26.0 | 1.5 | 2 RHC |
| 20 | 22.3 | 1.5 | 2 RHC |
| 25 | 22.3 | 2 | 1 LHC |
| 30 | 26.1 | 2 | 1 LHC |
| 35 | 22.3 | 2 | 1 LHC |
| 40 | 22.3 | 2.5 | 2 LHC |
| 45 | 26.1 | 2.5 | 2 LHC |
| 50 | 22.3 | 2.5 | 2 LHC |
| 55 | 22.3 | 3 | 1 RHC |

Figure 5:
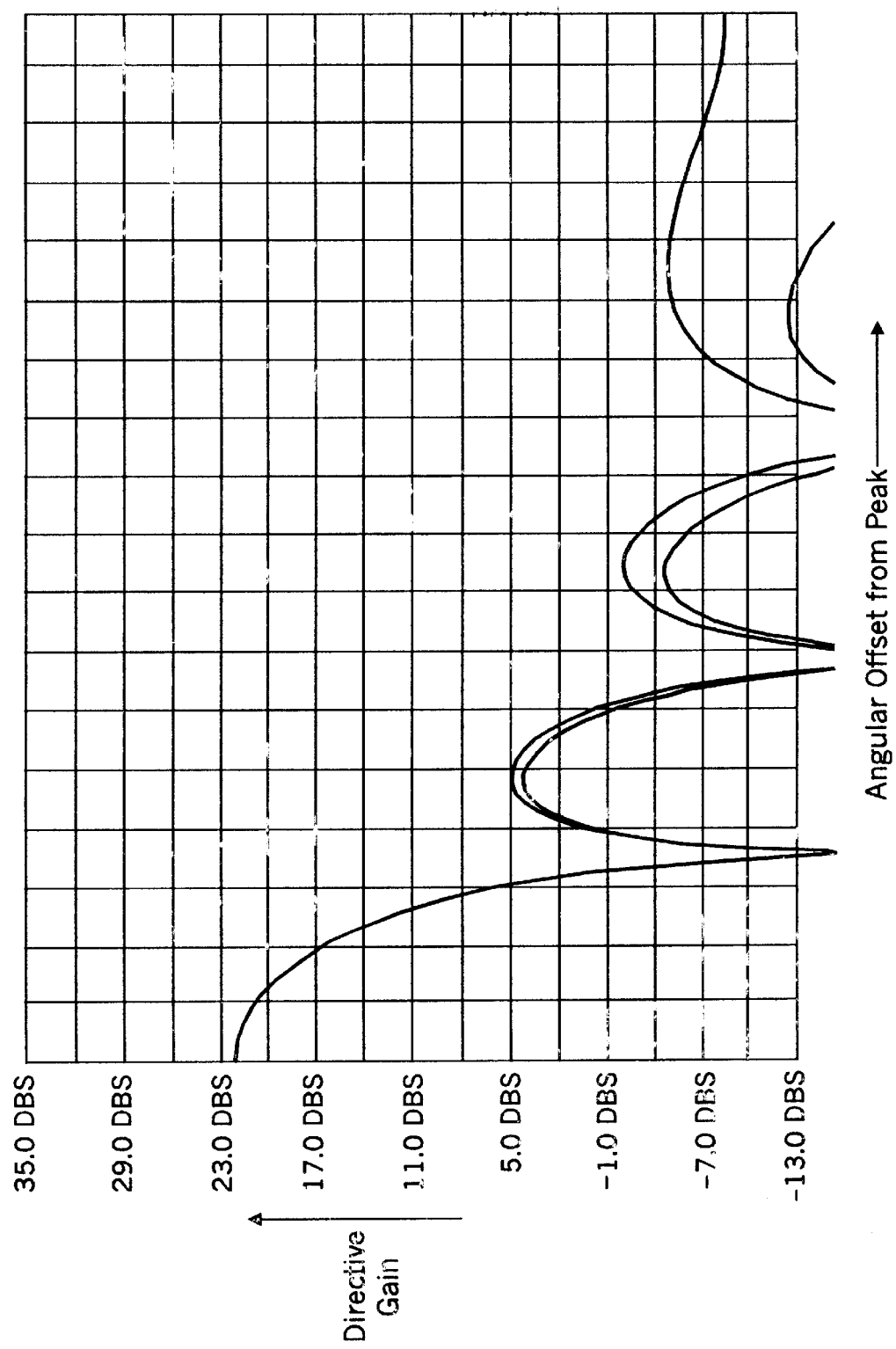
FIG. 5 illustrates E-plane and H-plane directivity patterns of an antenna with a circular aperture where directive gain is plotted as a function of angular offset from peak.

FIG. 5 illustrates typical E- and H-plane directivity patterns of an antenna with a circular aperture, such as a patch antenna or an array of such patches. The beamwidth of the antenna is determined by the total aperture of the antenna. The aperture may be set, for example, by choosing the number of elements in the array. FIG. 5 illustrates the directivity patterns for vertical and horizontally polarized components of an RHC or LHC wave. The gain for the vertically and horizontally polarized components is not quite the same in the sidelobes, which lead to imperfect suppression of the unwanted polarization in the sidelobes. This effect has been taken into account in computing the C/I values of Table 3 by using these patterns for both the base station sector antennas and for the outstation antennas, suitably scaled in beamwidth.

In a wireless in the local loop (WLL) embodiment of the present invention, which uses a radio system to deliver telephone service by wireless communications to residential areas, it is envisaged that fixed terminals installed at individual homes will use directional antennas, akin to TV antennas. This results in the system being better able to discriminate signals between those from a serving base station and those from interfering base stations. Interference from other sites was not taken into account in computing the C/I values of Table 3.

The values for C/I in Table 4 below were computed taking into account interference from six surrounding sites. The C/I values of Table 4 account for interference arriving from different angles through use of exemplary directivity patterns such as those illustrated in FIG. 5. The directivity pattern was scaled in beamwidth to be −4 dB at +/−15 degrees from sector center for base station use, and scaled to be −4 dB at +/−45 degrees for outstation use. Interference arriving from sites at different distances was accounted for by use of the free-space propagation law, i.e. a distance squared law. Free space propagation is a reasonable assumption for short range WLL applications up to about one mile, and a free space law is also a necessary assumption for obtaining polarization isolation. When a signal propagates by non-free space laws such as diffraction or reflection, polarization changes can occur. For this reason, adaptive selection of polarization will be described later.

TABLE 4

| Degrees Azimuth | $C/I_A$ (dB) | $C/I_B$ (dB) | $C/I_C$ (dB) | $C/I_D$ (dB) |
|---|---|---|---|---|
| 0 | 6.17 | 8.32 | 6.1 | 8.3 |
| 5 | 4.99 | 7.91 | 4.9 | 7.9 |
| 10 | 2.02 | 6.38 | 4.9 | 7.9 |
| 15 | −2.61 | 3.60 | 6.0 | 8.8 |
| 20 | 1.90 | 7.55 | 4.9 | 8.0 |
| 25 | 4.79 | 9.22 | 4.8 | 9.2 |
| 30 | 5.87 | 9.60 | 5.9 | 9.6 |

C/I taking account of surrounding cell/site interference
$C/I_A$ = 12 sectors using same channel and polarization (all sites)
$C/I_B$ = 12 sectors using same channel and alternating polarization
$C/I_C$ = 12 sectors using a first channel plus 12 interstitial sectors using a second channel
$C/I_D$ = 12 sectors using alternating polarization on a first channel plus twelve interstitial sectors using alternating polarization on a second channel According to the values in Table 4, the same channel may be used twelve times over at every site as long as the modulation and coding chosen for communications function satisfactorily at a C/I of around 7.9 dB. For example, the coherent TDMA modulation used in the European digital cellular system known as GSM can provide acceptable performance at this C/I when the fading environment is a Ricean fading environment of short-range WLL.

Even with the use of a pattern of fixed polarization re-use, an outstation should still select the polarization to be used depending on the outstation's location and the selection of the serving sector. This can change for mobile stations; but, even when constructing fixed installations, it is difficult to know in advance, absent a survey, which sector will be the best serving sector. Furthermore, outstations should, under ideal conditions, be of identical design, be capable of operating with any polarization and on any channel frequency with the optimum polarization being automatically adapted in operation after installation.

In addition, it may only be possible to assign a fixed pattern of polarization and channel re-use to base stations only in cases of regular spacing. Since a system can come into being by the addition of base stations as the need for capacity increases, irregular networks can result over a period of time. Thus, it may also be desirable for a base station to choose the polarization to be used in a given sector and a given radio channel adaptively in order to fit in with ongoing communications with minimum interference.

A method will now be described for enabling both outstations or base stations to dynamically choose the optimum polarization. When only the outstation has to choose its polarization to match the fixed polarization of a serving base station, it may do so as follows:

An outstation is installed with an antenna capable of being selected to receive signals of either polarization and to provide signals of the selected polarization to the receiver. The polarization is selected by a microprocessor controller. Upon installation, the outstation receiver searches for a special control-channel signal radiated permanently by base stations and provides an indication of control channel signal strength found on various channel frequencies using both polarizations. The indication may, for example, be displayed on a special installation aid or instrument to enable the installing engineer to adjust the antenna orientation to receive the best control channel signal strength, signal-to-interference ratio or other quality measure, such as lowest bit error rate. Once the installation is complete, the apparatus will listen to the control channel providing the best signal using the optimum receiver polarization for that channel. If the apparatus transmits to the base station, it may initially do so using a Random Access Channel (RACH) which can be located in relation to the selected "best" control channel. For example, the RACH may be at a constant frequency offset from the control channel receive frequency, or a constant time offset from a control channel receive timeslot, or both. Upon detecting the RACH transmission from an outstation, a base station transmits a traffic channel allocation to the outstation. This can include a frequency channel selection, a timeslot selection, a CDMA access code selection and a polarization selection. Although the sector serving a particular fixed outstation may remain constant along with the polarization of that sector on a given channel frequency, the polarization can change between different channel frequencies. One reason for this is to facilitate the multiplexing of different channels into the transmit sector antenna. In U.S. Pat. No. 5,584,057, herein incorporated by reference, Applicant describes the difficulties encountered in attempting to couple transmitters operating at adjacent channel frequencies into the same antenna and solves the problem by coupling even numbered channels to a first antenna and odd numbered channels to a second antenna. According to an exemplary embodiment of the present invention, a base station antenna is provided with a first transmit connection for signals to be transmitted using RHC and a second, isolated input for LHC signals. Alternate frequency channels can be coupled to alternate inputs, thus facilitating the coupling as well as enhancing the adjacent channel rejection by ensuring that adjacent channels in the same beam do not use the same polarization. This can be achieved by flipping the use of LHC and RHC between adjacent channels of the first channel group of FIG. 3 or FIG. 4, and likewise between adjacent channels of the second channel group. In this manner, the adjacent channels are used either with opposite polarization in the same beam or with the same polarization in different beams. The adjacent channel isolation requirements are relaxed while permitting a tighter channel spacing. Thus, depending on the assigned channel frequency, the outstation may also have to adapt its transmit and receive polarization.

In an irregular network topology, for example, where it is not possible to assign fixed polarizations to fixed base station sectors, an adaptive polarization selection mechanism can be used. A base station can choose a fixed polarization for the transmission of control channels and the reception of RACH signals, but such transmissions can be provided with additional coding protection using error correction coding to allow operation at lower C/Is. When a traffic channel is to be assigned in response to a call initiation, however, the base station comprises a channel allocation unit which determines the best set of channel parameters such as, frequency, timeslot, polarization and power level, to assign for the call.

A base station can determine the unwanted signal level in presently unassigned channels (i.e., frequency/timeslot combinations) in the sector in which the RACH message was deemed received from the outstation requesting or accepting service, the unwanted signals being received from other outstations that are active in different sectors or in different cells, and the unwanted signal level can be determined for both RHC and LHC polarization. The base station can then assign the channel and polarization that gives the lowest interference measurement for receiving data from the outstation. The channel to use for transmitting to the outstation may then be determined by a fixed frequency or time offset from the receiving channel. This method assigns a channel only with regard to uplink quality, and assumes that the downlink quality will be acceptable.

Figure 6:
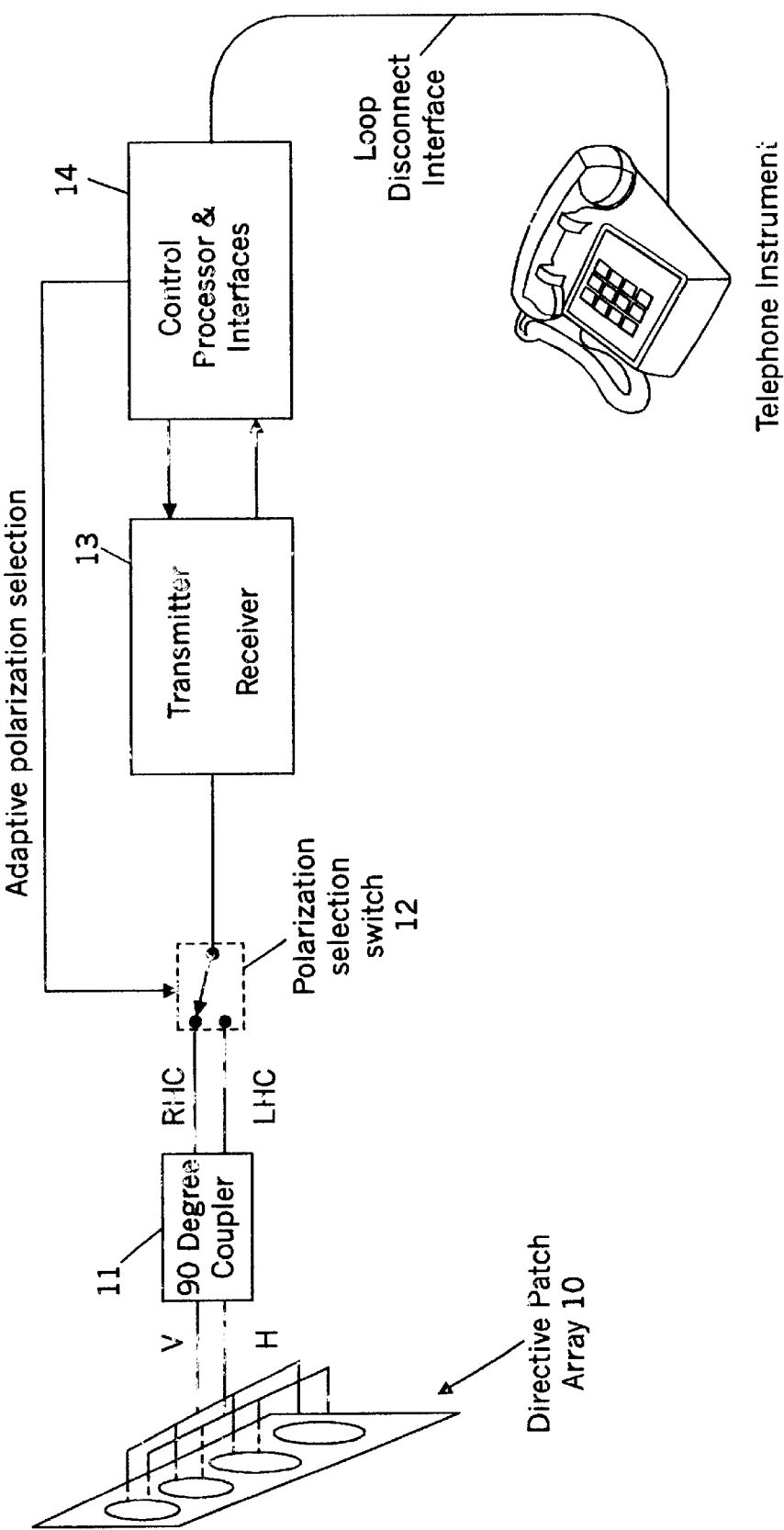
FIG. 6 illustrates a wireless terminal with adaptive polarization selection.

FIG. 6 illustrates a radiotelephone terminal suitable for adaptive polarization selection operation. A patch array (10) is an exemplary method for constructing directional antennas. A number of resonant conductive discs disposed over a ground plane can be fed at either of two alternative places on the disc to provide horizontal or vertically polarized radiation or reception. An array that forms only a single directive beam can have the discs cophased by a feed line connecting the horizontally polarized drive points and another feed line connecting the vertically polarized drive points. The combined feed points are then connected to a 4-port, 90-degree coupler (11) to form LHC and RHC polarization drive points. A Polarization selection switch (12) is connected to select either the RHC or the LHC drive point to be connected to transmitter/receiver (13) that is controlled by the control processor (14). The control processor selects the polarization assigned for receiving a call by the base station sending a channel assignment message to the terminal of FIG. 6. Control processor (14) may select the polarization for receive and the polarization for transmit separately when the radio protocol is of a Time Division Duplex (TDD) type in which the transmitter transmits bursts of data between the bursts of data being received.

If the terminal operates in a non-TDD mode in which transmission and reception occur at the same time, a duplexing filter is required.

Figure 7:
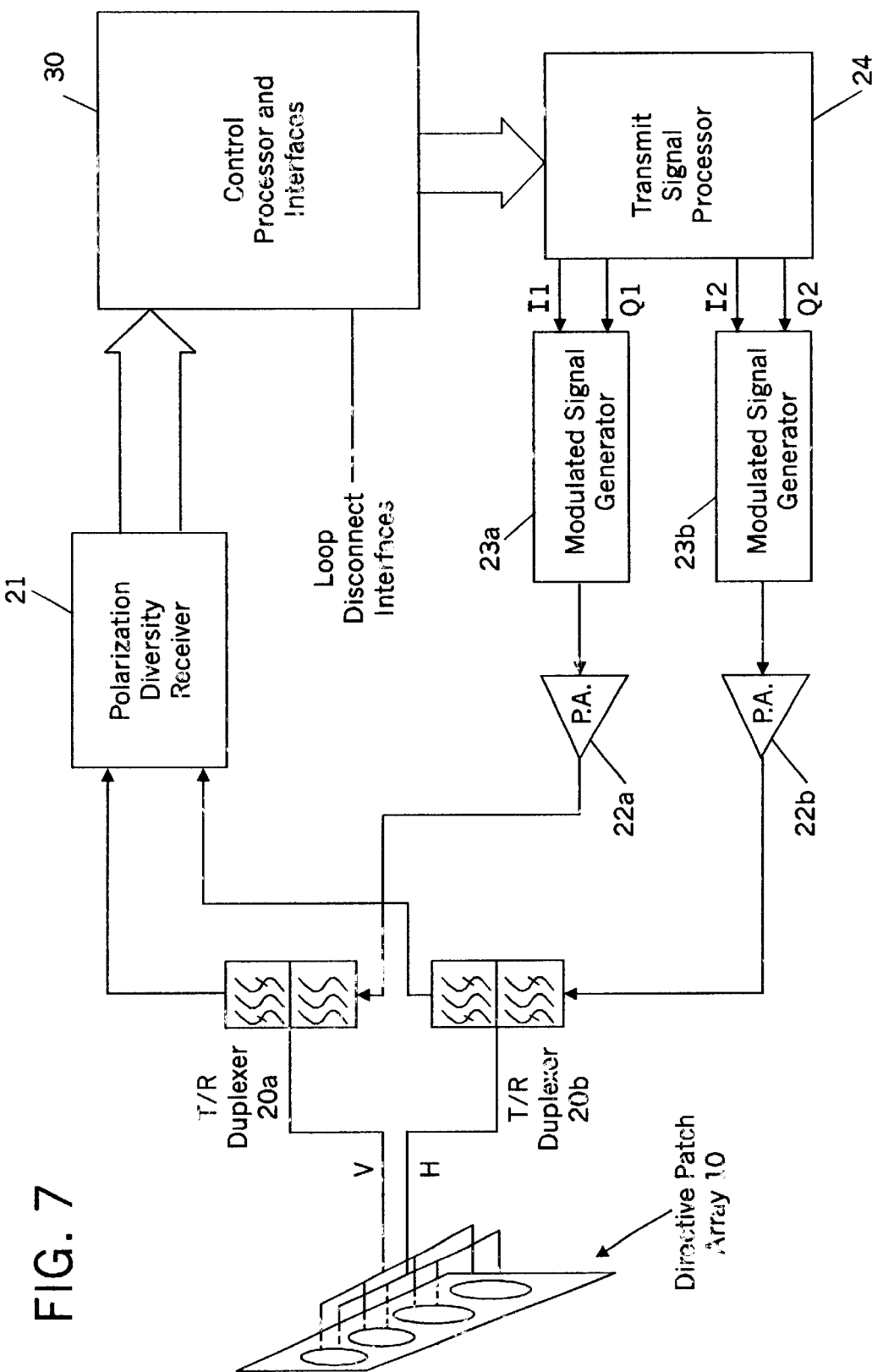
FIG. 7 illustrates a terminal with polarization diversity.

FIG. 7 illustrates a terminal configured to receive or to transmit either or both polarizations simultaneously. The horizontal and vertical array feed points are connected to transmit/receive duplexers (20a, 20b). These duplexers can be duplexing filters for Frequency Division Duplex operation (FDD) or T/R switches for TDD operation. The receive outputs of duplexers (20a, 20b) are connected to a polarization diversity receiver (21) which combines the two input signals to enhance reception of signals having the desired polarization while suppressing reception of signals having undesired polarization. Transmit power amplifiers (22a, 22b) are connected to corresponding transmit inputs of duplexers (20a, 20b) and are driven to amplify signals from signal generators (23a, 23b). The signal generators supply quadrature-modulated signals to the power amplifiers, the phase and data content of which is determined by I/Q signals I1, Q1 and I2, Q2 supplied by transmit signal processor (24). Signal processing (24) may be arranged, in a manner described in a pending patent application, Ser. No. 08/954,103, the subject matter of which is hereby incorporated by reference, to transmit a modulated signal with either of two orthogonal polarizations. This application further describes how processing (24) may adaptively determine signals (I1, Q1, I2, Q2) so as to produce a desired transmit polarization compensated for phase mismatch in amplifiers (22a, 22b) or duplexers (20a, 20b). U.S. Pat. No. 5,680,419, issued to Bottomley is hereby incorporated by reference. The '419 patent discloses receivers for processing signals from two or more antennas, including antennas of different polarization, in order to maximize signal-to-interference ratio by forming weighted combinations of the antenna signals that maximize a desired signal, minimize unwanted signals or maximize the ratio of the desired signals to unwanted signals.

Terminals of either of the types illustrated in FIGS. 6 and 7 can measure the strength of signals received on various channels (i.e. timeslots or frequencies) using either polarization and report these measurements to the serving base station. For example, a terminal of the type illustrated in FIG. 6 can measure signal strength on various channels with switch 12 initially in one position and then in the other position so as to evaluate signals received with both polarizations. A terminal of the type illustrated in FIG. 7 can evaluate signal strength received on various channels by first using the same diversity combining coefficients receiver 21 has determined to be optimum for receiving a control/paging/calling channel from the selected serving base station and then secondly using diversity combining coefficients modified to correspond to the other polarization (e.g. changing the sign of the combining coefficients for one of the channels, vertical or horizontal). Receiver 21 can determine the optimum combining coefficients for each of a direct ray and a series of delayed multipath rays using the technique of the '419 patent including correlation of received signals with a known symbol sequence or syncword. The terminal of FIG. 7 indicates in signal strength reports it sends to the base station whether the signal strength was measured with the same or opposite polarization to that of the control channel signal received from the serving base station.

The terminals can also use a bit flag for providing a polarization indication to the base station. For example, the flag can be set for RHC and not set for LHC or set for LHC and not set for RHC. The base station transmits to the subscriber terminal using the flag indication received from the subscriber terminal.

Figure 8:
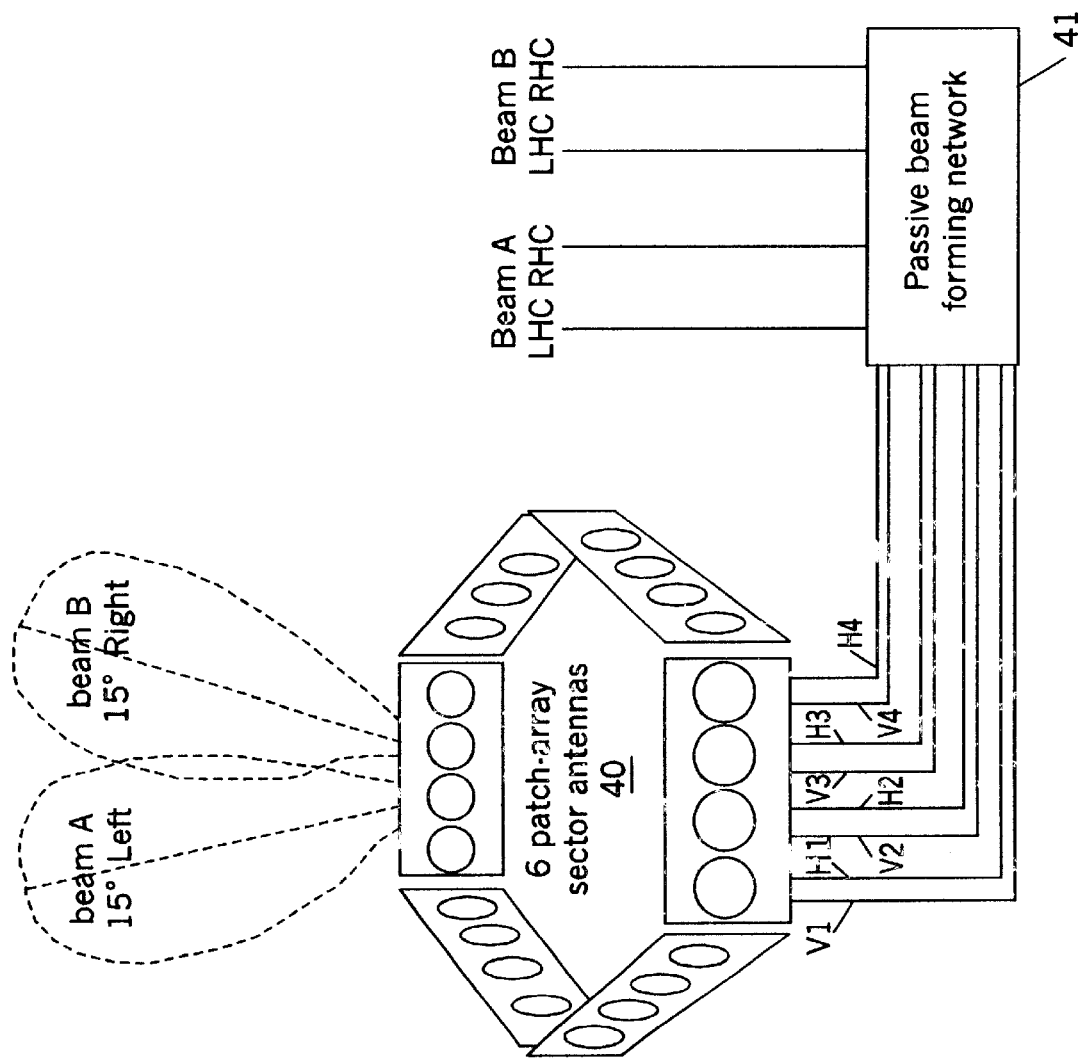
FIG. 8 illustrates an exemplary WLL base station for determining antenna polarization.

FIG. 8 illustrates an exemplary base station antenna that provides radiation in twelve sectors spaced 30 degrees apart in azimuth using both polarizations. Six patch-arrays (40) are arranged with an azimuthal spacing of 60 degrees, each array providing two directional beams for transmission or reception with the beam peak directions offset by +/−15 degrees relative to the normal to the array aperture, thus forming twelve beams spaced at 30 degrees in azimuth. Both RHC and LHC polarizations can be used in each direction. Each of arrays (40) comprises a number, such as four, of radiating elements or sub-arrays. A sub-array can, for example, comprise a plurality of coupled patches to increase the gain of each "element". The sub-array can be a vertical column of elements to provide vertical directivity by constraining the vertical beamwidth to the horizontal plane.

Each radiating element, such as a patch element, can have a connection point for vertically polarized transmission or reception and another point for horizontal polarization. Passive beamforming network (41) can include 90-degree couplers, such as coupler (11) of FIG. 6, for converting linear polarizations to circular polarizations. Thus, beam forming network (41) couples the four horizontally polarized antenna element signals H1, H2, H3, H4 with the four vertically polarized signals V1, V2, V3, V4 to produce two beams of both RHC and LHC polarization.

Figure 9:
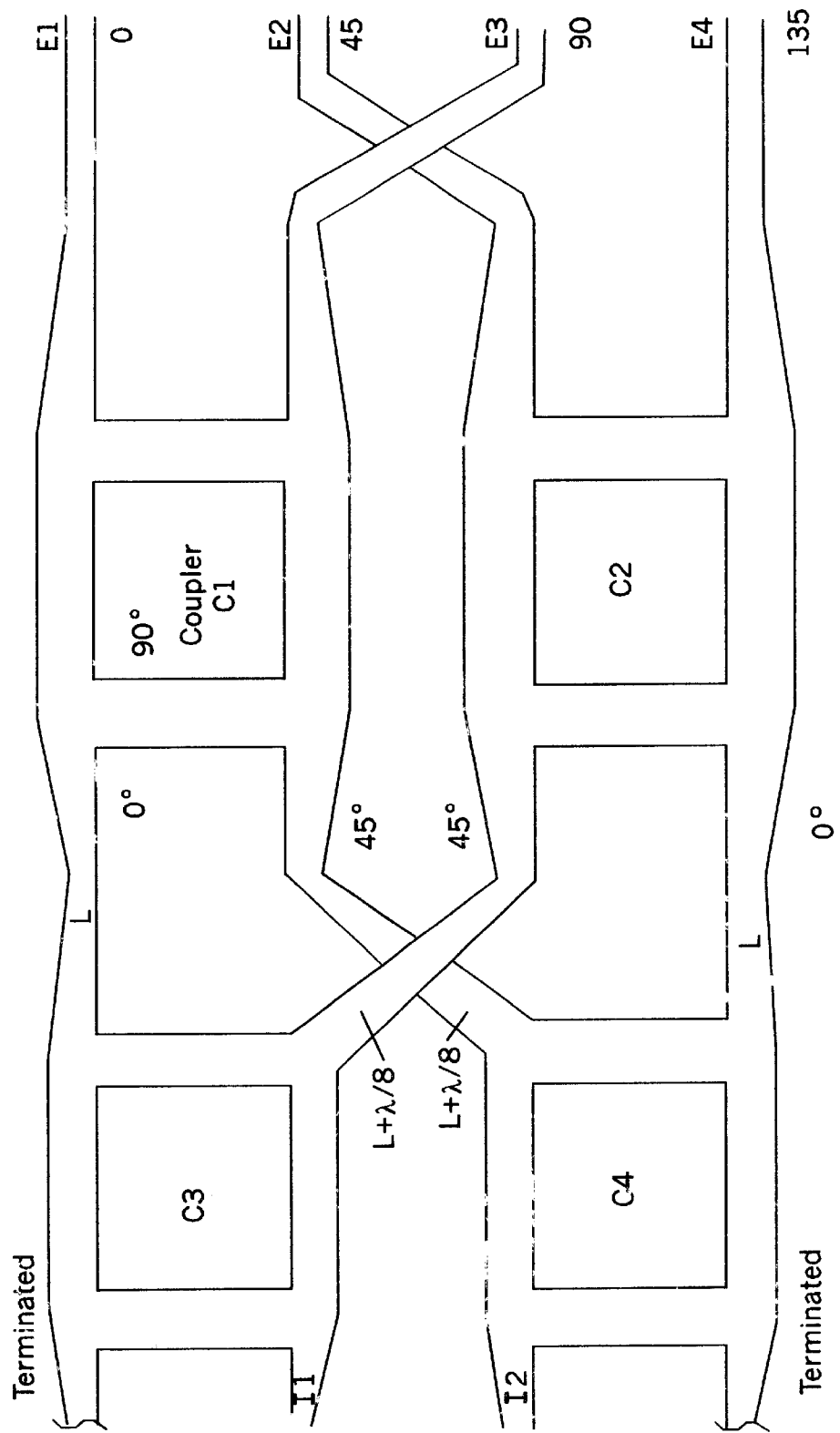
FIG. 9 illustrates a phasing network for the arrays of FIG. 8.

FIG. 9 illustrates an exemplary beamforming network using additional 90 degree couplers of a type similar to those used for changing linear polarization to circular polarization. Coupler C3 accepts a transmit signal at input port I1 and splits it with relative phase 0, 90 degrees between its two outputs. Line length of L and L plus ⅛th of a wavelength connect the two outputs to couplers C1 and C2 such that they are driven 45 degrees out of phase. Couplers C1, C2 then further split the signal to elements E1, E2, E3, E4 such that the four elements are relatively phased by 0, 45, 90 and 135 degrees. An input at I2 to coupler C4, on the other hand, provides outputs to elements E1, E2, E3, E4 phased by the inverted sequence 135, 90, 45, 0 degrees, which is orthogonal to the first sequence. This ensures that there is no coupling between inputs I1 and I2 so that they are independent inputs. The phase slope results in a beam which is either to the right or the left of a normal to the plane of the array elements. In order for the left/right displacement of the two beams to be +/−15 degrees, the array element spacing shall be equal to $$LAMBDA/(8*sin(15))=0.48 \text{ of a wavelength;}$$

This can be achieved by forming the patches on a dielectric substrate having a dielectric constant greater than unity such that the physical dimensions of the patch are less than 0.5 wavelengths in diameter, thus allowing a spacing between patches of 0.48 wavelengths without mechanical interference.

A first network of the type illustrated in FIG. 9 may be used for one polarization (e.g. RHC) and a second network for the opposite polarization (e.g., LHC), thus providing four inputs to the beamformer, two inputs I1 and I2 for each of RHC and LHC. Passive beamformers such as those illustrated in FIG. 9 are reciprocal and may be used for both transmit and receive provided the beamforming network bandwidth is sufficient to cover all transmit and receive frequency channels. Broadband 90-degree couplers are disclosed in U.S. Pat. No. 4,127,831, issued to Riblet, which is hereby incorporated by reference.

The base station illustrated by FIG. 8 and phasing network illustrated in FIG. 9 can be extended to a 24-sector system having 24 beams displaced by 15 degrees in azimuth. This can be achieved by using twelve arrays each generating two beams offset by +/−7.5 degrees to normal, or alternatively, by using 6 arrays each generating four beams with an offset to normal of −22.5 degrees, −7.5 degrees, +7.5 degrees and +22.5 degrees. Four offset beams may be obtained using an array of four elements (or subarrays) connected to a (4+4)-port Butler beamforming matrix.

Alternatively, active transmit or receive beamforming can be used in accordance with the '503 patent. Applicant's pending U.S. patent application Ser. No. 08/568,664, hereby incorporated by reference, describes an efficient means for carrying out transmitter modulation and beamforming for multiple signals and beams simultaneously when using active transmit arrays.

Using the above teachings, a radio base station can be constructed which allows the same radio channel to be used 12 times over in each of a plurality of radio base station sites. One radio channel may, for example, mean one of eight timeslots on a 200 KHz-wide frequency channel carrying traffic in accordance with a GSM-like protocol. There are five 200 KHz channels per 1 MHz of spectrum; thus, the total provided capacity is 12×8×5 or 480 GSM traffic channels per Megahertz per base station site. Such a capacity allows about 4000 telephone subscribers to be served by one site, when the traffic generated per subscriber is just over 0.1 Erlangs, using only 1 MHz of bandwidth in each of the uplinks and downlinks.

A person skilled in the art may adjust the exemplary parameters used herein in order to adapt a system to different types of traffic, such as voice, fax or Internet data, using for example different bandwidths or multiples of the basic channel bandwidth or multiple slots to accommodate higher data rates, without departing from the spirit or scope of the invention as described by the attached claims. Moreover, although exemplary embodiments of the present invention discuss exemplary TDMA access methodologies, those skilled in the art will appreciate that the present invention is equally applicable to other methodologies, e.g., code division multiple access (CDMA).

What is claimed is:

1. A subscriber terminal, comprising:

an antenna for receiving and transmitting signals;

a first and second duplexer connected to the antenna to receive and transmit different polarizations simultaneously;

a polarization diversity receiver connected to the first and second duplexer for combining two signals to enhance reception of signals having a desired polarization while suppressing reception of signals having undesired polarization;

a signal strength measurement means that evaluates signal strength received on various channels by first using select diversity combining coefficients the polarization diversity receiver has determined to be optimum for receiving a channel from a selected serving base station and then secondly using diversity combining coefficients modified to correspond to the other polarization for controlling the first and second duplexer and measuring signal strengths using the selected control channel polarization and a nominally orthogonal polarization; and a call processing means for receiving a traffic channel allocation message including a polarization allocated in dependence on the signal strength measurements.

2. A subscriber terminal comprising:

an antenna for receiving and transmitting signals;

a first and second duplexer connected to the antenna to receive and transmit different polarizations simultaneously;

a polarization diversity receiver that evaluates signal strength received on various channels by first using select diversity combining coefficients the polarization diversity receiver has determined to be optimum for receiving a channel from a selected serving base station and then secondly using diversity combining coefficients modified to correspond to the other polarization for controlling the antenna means to transmit a signal using a polarization having a lowest signal strength measurement in a preceding time period for combining two input signals to enhance reception of signals having a desired polarization while suppressing reception of signals having undesired polarization for controlling said terminal antenna means and making signal strength measurements using different selected polarizations; and a terminal transmitter means for controlling the first and second duplexer to transmit signals using a polarization having a lowest signal strength measurement in a preceding time period.

* * * * *